(12) United States Patent
Ulanovskiy

(10) Patent No.: US 8,598,724 B2
(45) Date of Patent: Dec. 3, 2013

(54) WIND-DRIVEN POWER PLANT EQUIPPED WITH FOLDING AND LIFTING MECHANISM FOR RAISING AND STOWING THE TOWER

(76) Inventor: Iakov Ulanovskiy, Moscow (RU)

(*) Notice: Subject to any disclaimer, the term of this patent is extended or adjusted under 35 U.S.C. 154(b) by 660 days.

(21) Appl. No.: 12/494,606

(22) Filed: Jun. 30, 2009

(65) Prior Publication Data

US 2010/0102557 A1    Apr. 29, 2010

(30) Foreign Application Priority Data

Oct. 28, 2008  (RU) .................. 200802096

(51) Int. Cl.
*H02P 9/04*    (2006.01)

(52) U.S. Cl.
USPC .............................. 290/44; 290/55

(58) Field of Classification Search
USPC ......................................... 290/44
See application file for complete search history.

(56) References Cited

U.S. PATENT DOCUMENTS

| | | | | |
|---|---|---|---|---|
| 446,744 A * | 2/1891 | Robinson | ............... | 52/116 |
| 2,213,870 A * | 9/1940 | Scholl | ............... | 52/117 |
| 4,779,006 A * | 10/1988 | Wortham | ............... | 290/55 |
| 5,025,606 A * | 6/1991 | McGinnis et al. | ...... | 52/745.17 |
| 6,782,667 B2 * | 8/2004 | Henderson | ............... | 52/116 |
| 7,105,940 B2 * | 9/2006 | Weesner et al. | ............... | 290/44 |
| 7,192,252 B2 * | 3/2007 | Duguet et al. | ............... | 416/142 |
| 7,218,013 B2 * | 5/2007 | Platt | ............... | 290/55 |
| 7,242,107 B1 * | 7/2007 | Dempster | ............... | 290/55 |
| 7,294,939 B1 | 11/2007 | Chen | | |
| 7,339,286 B1 * | 3/2008 | Chen et al. | ............... | 290/55 |
| 7,821,147 B2 * | 10/2010 | Du Bois | ............... | 290/44 |
| 2004/0169376 A1 * | 9/2004 | Ruer et al. | ............... | 290/55 |
| 2005/0218657 A1 | 10/2005 | Weesner et al. | | |
| 2006/0099075 A1 | 5/2006 | Von Mutius | | |
| 2006/0213697 A1 * | 9/2006 | Sutherland | ............... | 180/2.2 |
| 2007/0160473 A1 * | 7/2007 | Arel | ............... | 416/11 |
| 2007/0284885 A1 * | 12/2007 | Menges | ............... | 290/55 |
| 2008/0196758 A1 * | 8/2008 | McGuire | ............... | 136/245 |
| 2009/0079161 A1 * | 3/2009 | Muchow et al. | ............... | 280/400 |

(Continued)

FOREIGN PATENT DOCUMENTS

AU    2004220754    5/2005
DE    2646353 B  *  4/1978

(Continued)

OTHER PUBLICATIONS

RU55887, English Translation, dated, Oct. 15, 2009.
SU1612107, English Translation, dated Oct. 26, 2009.
Artobolevski, I. "Mechanisms in the Modern Techniques," Hydraulic and Pneumatic Drives, Vo. 7, pp. 266-267 (1980).
English language abstract of FR 2446930, published Aug. 14, 1980.

*Primary Examiner* — Tulsidas C Patel
*Assistant Examiner* — S. Mikailoff
(74) *Attorney, Agent, or Firm* — DLA Piper LLP US

(57) ABSTRACT

A wind-driven electric plant includes a mast with a windwheel and a generator in a nacelle and a shielding chamber with a base, walls, and a cover. The mast is coupled to the nacelle and mounted in the shielding chamber. The mast may comprise a set of sections pivotally connected to each other such that the mast has the capability of folding and spreading, or the mast may comprise a set of telescoping or folding and spreading sections. A mast transfer mechanism is configured to move the mast between an operating position with the windwheel outside the chamber and a stored position with the windwheel inside the chamber.

11 Claims, 8 Drawing Sheets

(56) References Cited

U.S. PATENT DOCUMENTS

| | | | |
|---|---|---|---|
| 2010/0032955 A1* | 2/2010 | Chen | 290/55 |
| 2010/0117369 A1* | 5/2010 | Monostory | 290/55 |
| 2010/0140949 A1* | 6/2010 | Pitre et al. | 290/55 |
| 2010/0181768 A1* | 7/2010 | Lavaur et al. | 290/44 |
| 2011/0109098 A1* | 5/2011 | Lavaur et al. | 290/55 |
| 2011/0176256 A1* | 7/2011 | Van Straten | 361/601 |
| 2012/0007365 A1* | 1/2012 | Harrison et al. | 290/55 |
| 2012/0085387 A1* | 4/2012 | French, Sr. | 136/245 |

FOREIGN PATENT DOCUMENTS

| | | | |
|---|---|---|---|
| DE | 19931713 A1 | * | 1/2001 |
| FR | 2446930 | | 8/1980 |
| FR | 2446930 A | * | 9/1980 |
| FR | 2912450 A1 | * | 8/2008 |
| NL | 1004066 C2 | * | 3/1998 |
| RU | 55887 | | 8/2006 |
| SU | 1612107 | | 12/1990 |

\* cited by examiner

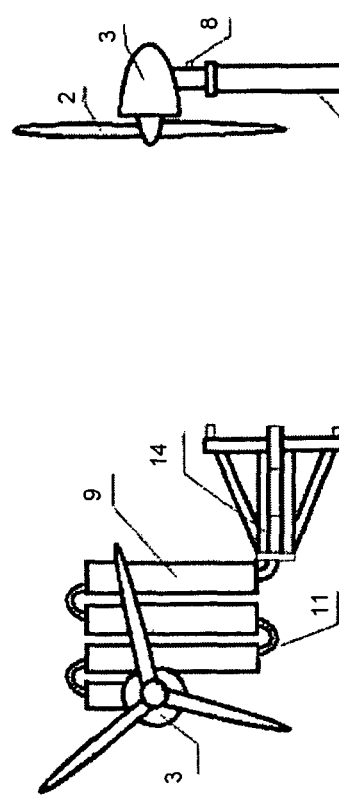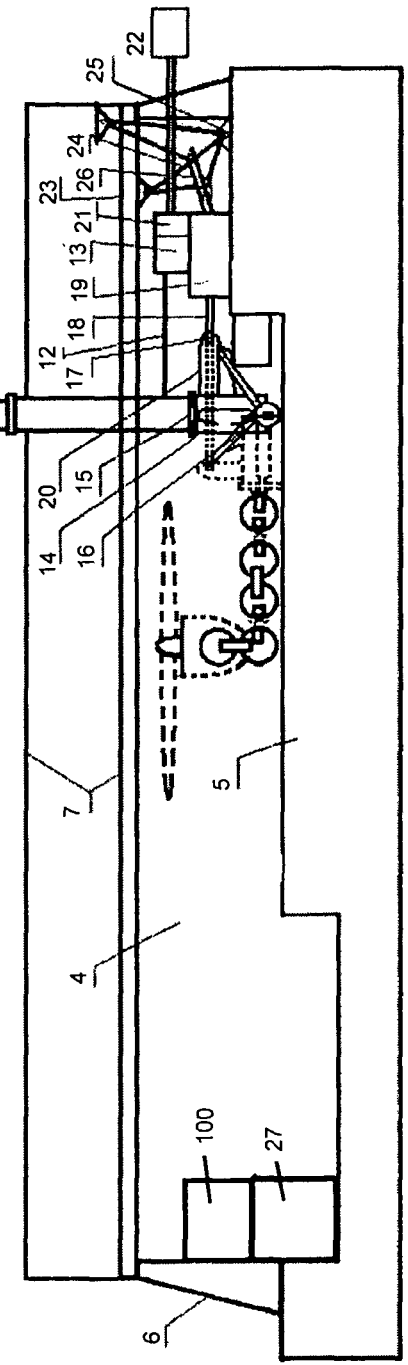
FIG. 1D
FIG. 1A

WIND-DRIVEN POWER PLANT EQUIPPED WITH FOLDING AND LIFTING MECHANISM FOR RAISING AND STOWING THE TOWER

CROSS REFERENCE TO RELATED APPLICATIONS

This application claims the benefit of Russian Patent Application No. 200802096, filed Oct. 28, 2008.

BACKGROUND

1. Field of the Invention

The invention relates generally to wind-power engineering and particularly to wind-driven electric plants, providing an optimal plant operation in emergency cases, preventing its destruction, under strong wind loads (e.g., in a storm, a tornado, a whirlwind), during an earthquake, under a threat of radioactive danger and so on.

2. Discussion of the Background

Wind-driven electric plants comprising a mast with a windwheel and a generator along with a control system are known in the art, e.g., SU 1612107, published Jul. 12, 1990. This known device provides protection of the plant structural components under strong wind loads. The windwheel blades turn to a feather position by means of blade rotation gear according to a control system command from the wind speed sensor under a storm wind, preventing blade destruction under the windwheel excessive acceleration because of a storm wind. A shortcoming of the known device is its inferior reliability, caused by blades remaining set to power takeoff angles when the blade rotation gear or the control system fails. When such failure occurs, a storm wind can rotate the windwheel to an unacceptably high speed, which can lead to the windwheel's destruction.

Also known in the art is a wind-driven electric plant containing a mast with a windwheel and a generator, a shielding chamber comprising a base, walls and a cover, and a mast transfer control device, connected with response sensors. (RU patent 55,887, Int. Class F03D 7/04, F03D 11/04, 27 Aug. 2006). The mast is attached at the shielding chamber base by a fastening-and-lifting device and attached to a mast transfer mechanism for stowing the mast in the shielding chamber or for setting the mast to operating position. This device is prior art.

The mast in the prior art is attached at the shielding chamber base by four braces, one of said braces is equipped with a rod, connected to a folding-spreading gear for the mast stowing in the shielding chamber or for its settling to the vertical operating position. The plant is equipped with an emergency response sensor and a folding-and-spreading gear automatic control system, connected with each other, for an automatic folding-and-spreading process.

One of the considerable shortcomings of the prior art is its inferior efficiency in emergency situations, caused by a number of structural constraints. Thus, a fastening-lifting device, realized as four braces, one of which is equipped with a rod, connected to a gear of a mast transfer mechanism, does not provide for quick and efficient stowing of the mast with the windmill in the shielding chamber or for restoration to the vertical operating position, since simultaneous manipulation of other braces is necessary for realizing the required operations. This increases a number of actuating devices and requires their synchronized actions, thus increasing the complexity of the device and increasing the execution time of operations. Moreover, mechanical damage to the device structural elements may occur during the mast stowing in the shielding chamber. It should be also mentioned that the known device can't provide continuous functioning in the case of a power supply failure under extreme weather conditions.

Abovementioned shortcomings considerably decrease the efficiency of the prior art device under extreme weather conditions.

SUMMARY

The claimed invention is directed to increase the efficiency and reliability of a wind-driven electric device functioning under extreme weather conditions by improving operation of the device characteristics, such as quickly stowing the device in a shielding chamber, maintaining a standard operational cycle, and device safety and portability.

BRIEF DESCRIPTION OF THE DRAWINGS

The essence of the claimed invention is also disclosed in the examples of its realization with the reference to the applied figures, said figures demonstrating the following:

DETAILED DESCRIPTION

Figure 1B:
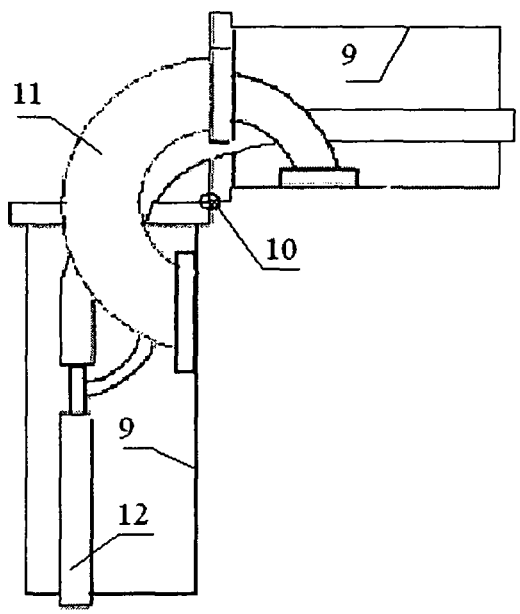
FIGS. 1A-1D are diagrams of a wind driven power plant according to a first embodiment.

The above-mentioned technical result is obtained according to the first embodiment of the invention (FIGS. 1A-1F) by the wind-driven electric plant, comprising a mast with a windwheel and a generator, a shielding chamber with a base, walls and a cover, and an automatic control device connected to response sensors. Said mast is fastened to the shielding chamber base by a fastening-and-lifting device attached to a mast transfer mechanism for stowing the mast in the shielding chamber or for setting the mast to the operating position. Said fastening-and-lifting device is a post that can be rigidly fastened to the mast base and attached by a hinge to the base of the shielding chamber and pivotally connected to the mast transfer mechanism.

In some embodiments, the mast is a set of pivotally connected sections, with the capability of folding and spreading, and operated by an automatic control device.

The above-mentioned technical result is achieved in a second embodiment (FIG. 2) of a wind-driven electric plant comprising a mast with a windwheel and a generator, a shielding chamber with a base, walls and a cover, and an automatic control device connected to response sensors. Said mast is fastened at the shielding chamber base by a fastening-and-lifting device attached to a mast transfer mechanism for stowing the mast into the shielding chamber or for setting the mast into the operating position. Said mast is a set of sections that may extend and retract telescopically, and may be controlled by the automatic control device. The fastening-and-lifting device is a post, rigidly fastened to the base of the shielding chamber, and the mast may move slidably therein.

The mast section folding and spreading mechanism, of both embodiments, may also have manual control capability. In addition, both embodiments may comprise automatic remote control.

Also, both embodiments may further include a mechanism for opening and closing a shielding chamber cover. The cover opening mechanism may be connected to an automatic control device and/or a manual control device.

Both embodiments discussed above may comprise meteorological sensors, and/or photo sensors and/or video sensors, equipped with a comparator unit of a visual image and extreme situation images, and/or radiation sensors, and/or radio signal receivers as response sensors. The meteorological sensors may include temperature, pressure, humidity and wind speed sensors or a combination of two or more of the aforementioned. A threshold may be associated with each sensor such that a sensed condition that crosses the threshold may trigger the stowing or unfolding of the windwheel. The photo sensor may comprise, for example, a photographic satellite. The image from the satellite may be on the range of 1 square kilometer. An emergency condition is defined for the image, so that the windwheel can be stowed when the emergency condition is detected in the image and unfolded when the condition has passed. The radio signal receiver may be configured to detect an emergency message broadcast by, e.g., an official notification system such as the Emergency Broadcast System in the U.S.

In addition, both embodiments may comprise an independent power supply source (unit), connected to the automatic control device. The independent power supply unit may be a solar photo converter and/or a solar thermal collector with thermal-electric energy converter, and/or a diesel-electric unit and an accumulator battery.

Also, according to the both embodiments, the stand-alone shielding chamber is preferably located below the ground level.

A fastening-and-lifting device that is a post that can be rigidly fastened to the mast base and attached by a hinge to the base of the shielding chamber and pivotally connected to the mast transfer mechanism allows considerable simplification and acceleration of the mast stowing in the shielding chamber and/or its setting back into the vertical operating position. The mast, comprising sections pivotally connected with each other with the ability of folding and spreading and connected to the automatic control device, enables execution of mast section folding upon receiving a command (e.g. under extreme situation), and further enables stowing in the shielding chamber in the folded form. This considerably decreases the risk of mechanical damage of the structural elements during the process of stowing in the shielding chamber, as well as during temporary device shutdown, and increases the device's efficiency on the whole.

In the second embodiment, the mast is a set of sections that may extend and retract telescopically, and a lifting support device comprising a post, rigidly fastened to a base of a shielding chamber, in which the mast may move slidably. The above-mentioned characteristics of the second embodiment of the wind-driven electric plant let the plant work efficiently in the presence of extreme weather situations due to simplification and acceleration of the processes of stowing the mast in the shielding chamber and restoring the mast to the operating position, and decrease risk of damage to the plant.

The wind-driven electric plant according to both embodiments may include manual controls for the mechanism for folding and spreading of the mast sections. This allows folding and spreading of the mast sections in an emergency, thereby ensuring continuity of the plant operation.

The wind-driven electric plant according to both embodiments may include a remote control. This ensures immediate temporary closedown of the plant under a threat of an emergency situation and immediate returning of the plant to the operating position.

The wind-driven electric plant in both embodiments may have a mechanism for opening and closing of the shielding chamber cover that is connected with the automatic control device. This allows this process to be accelerated upon accepting a command (e.g. under extreme weather conditions) and considerably increases device efficiency.

Additionally, the wind-driven electric plant in both embodiments may have a manual control mechanism for opening and closing of the shielding chamber cover. This allows the emergency opening/closing of the shielding chamber cover in a worst-case situation and thereby ensures continuity of the plant operation process.

Use of meteorological sensors, and/or photo sensors and/or video sensors, equipped with a comparator unit of a visual image and extreme weather images, and/or radiation sensors, and/or radio signal receivers as response sensors for both variants of the invention provides the ability of efficient response to a wide spectrum of signals/indicators of an extreme situation threat or approach, increases the efficiency of the plant work under said extreme conditions.

The wind-driven electric plant in both embodiments may have an independent power supply source (unit), connected with the plant automatic control device, such as a solar photo converter and/or a solar thermal collector with a thermal-electric energy converter, and/or a diesel-electric unit with an accumulator battery. This ensures continuity of plant operation in case of power failure under extreme operating conditions.

Also, both embodiments of the invention may comprise a plant shielding chamber located below ground level, thereby providing an increase of the plant protection from environmental conditions and supporting continual and safe operation of the plant.

The increase of the plant protection from strong winds in weather emergency situations and the improvement of operating characteristics therefore enhance the plant operating time under normal conditions.

The automatic system operating speed and plant protection resulting therefrom increases the efficiency of the plant protection and thus the plant operational life. The continuity of plant operations under extreme weather situations allows activation of the plant protection mechanisms, operation of response sensors and the restoration of normal operating conditions for the plant.

The safe working of the plant under extreme weather conditions is provided by the efficient protection, operating speed and immediacy of the plant protection actuating mechanisms as well as by the ability of the continual plant operation supported by additional sources of power.

The automatic control device, used in both embodiments, is an automatic electronic switch, comprising, e.g., conversion units, commutators and couplings, which allows the generation of commands necessary for the device operation, e.g., commands for the mast movement for its stowing in the shielding chamber or for setting the mast to operating position, the mast section folding/spreading, opening and closing of the shielding chamber cover, and switching on/off of an independent power supply source. A description of the aforementioned devices is given in scientific and technical literature (e.g. Borodin I. F., Andreev S. A., "The Automation of Technological Processes and Automatic control Systems" "Forum", Kelim Y. M. "The Standard Elements of Automatic Control Systems," 2004, etc.).

Figure 4:
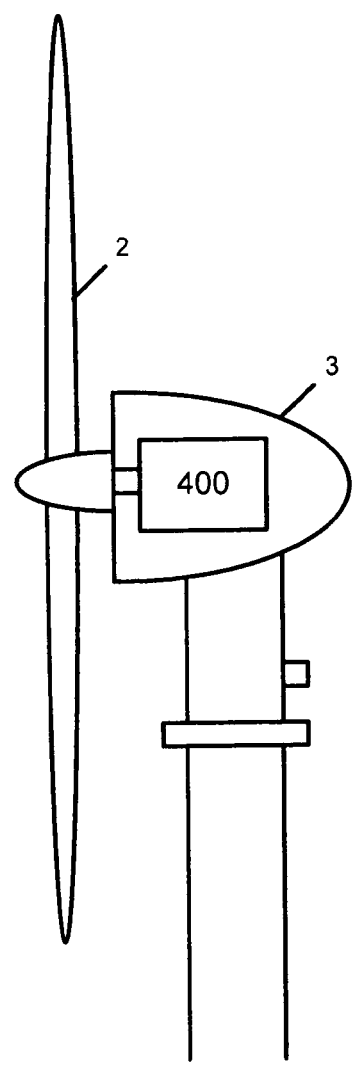
FIG. 4 is a diagram of a nacelle according to an embodiment of the invention.

A first embodiment of a wind-driven electric plant shown in FIG. 1A comprises a mast 1 with a windwheel 2 and a generator inside a nacelle 3, a shielding chamber 4 with a base 5, walls 6 and a cover 7. A response sensor 8 is placed at the mast 1. As seen in FIG. 4, the generator 400 is inside the nacelle 3 and connected to the windwheel 2.

Figure 1C:
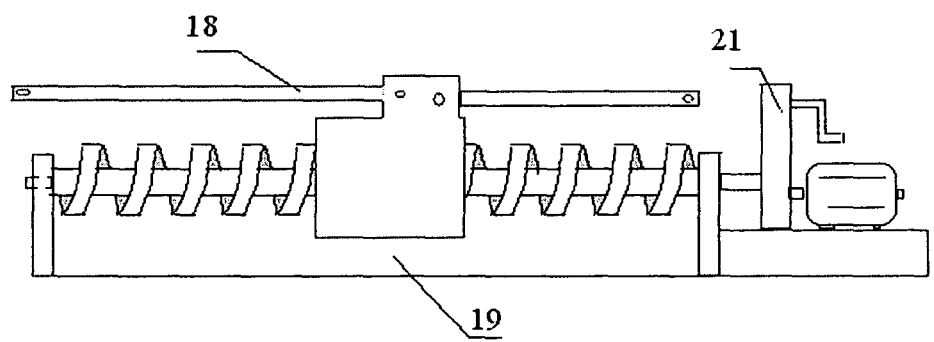
Figure 1E:
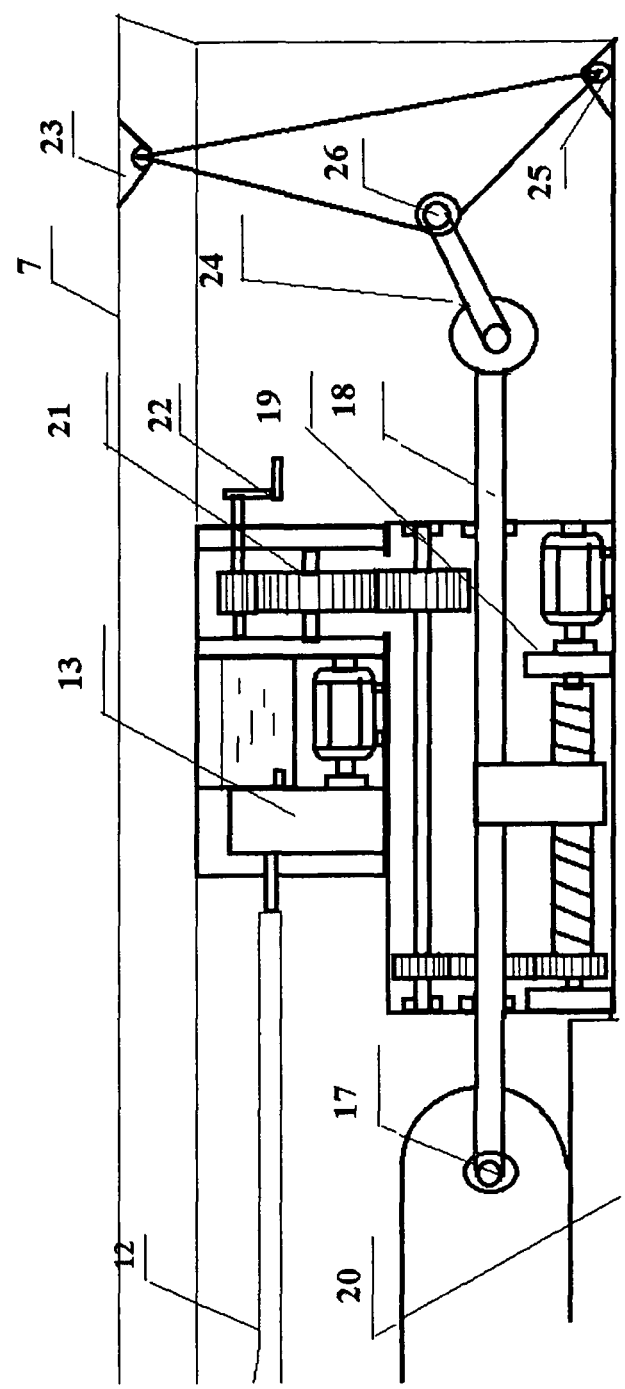

Referring now to FIG. 1B, the mast 1 comprises sections 9, connected with each other by hinges 10. Each of the hinges 10 are equipped with circular hydraulic actuators 11 connected to flexible hose 12. As shown in FIG. 1E the flexible hose 12 is connected to compressor 13 with the electromotor 98 for fluid supply from the hydraulic fluid reservoir 99 to the circular hydraulic actuators 11. The circular hydraulic actuators 11 may be of the type shown in the seven volume book written by I. I. Artobolevski, "Mechanisms in the Modern Technics," published by "Science", Moscow 1980, in volume 1, "Hydraulic and Pneumatic Drives" under the heading "Hydraulic Drives," p. 625.

Referring now back to FIG. 1A, the mast 1 is fastened on the base 5 by means of the post 14. The post 14 is rigidly fastened to the mast 1 base with the flanged fastener 15 on one side, and to the base 5 with the hinge 16 on the other. The post 14 is connected via hinge 17 with one end of the rod 18, said rod 18 connected to the screw electric drive 19, and rests against the fixing unloading device 20. Additionally, the screw electric drive 19 is connected with the manually driven rotation device 22 of the electric drive 19 via the reduction gearbox 21 as shown in FIG. 1C.

The cover 7 is connected by the hinge 23 with the lever 24, said lever 24 in its turn connected via the hinge 25 with the base 5 of the chamber 4 and via the hinge 26 with the other end of the rod 18. Additionally, the wind-driven electric plant contains the independent power supply unit 27, disposed in the chamber 4 and connected with the compressor 13 and the electric drive 19 via the electronic switch (not shown in FIGS. 1A-1F).

FIG. 1E shows an enlarged side view of a portion of FIG. 1A illustrating the interaction of components utilized to initiate raising and stowing of the wind-driven electric plant.

Figure 1F:
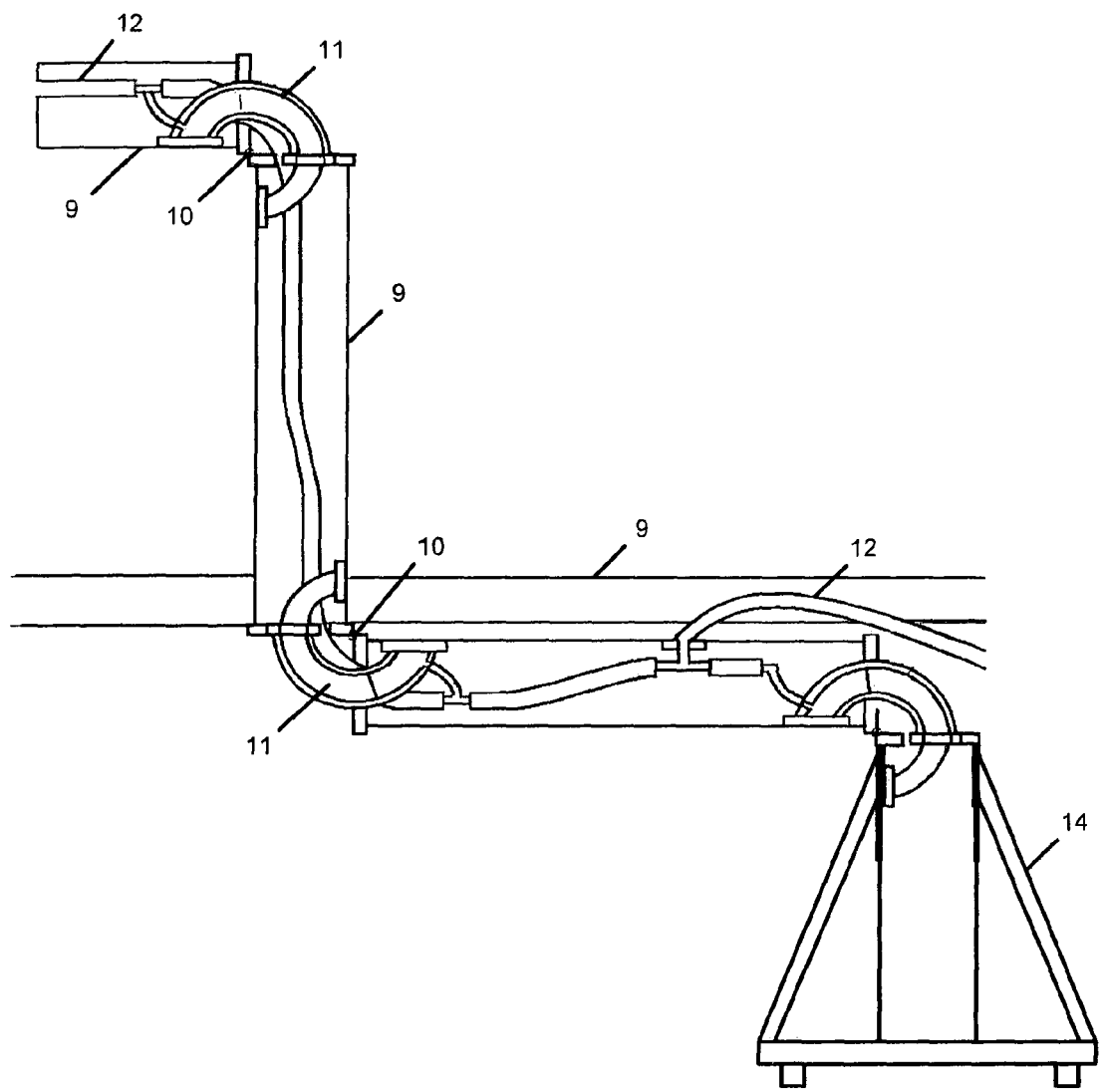

FIG. 1F shows a front view of the mast 1 partially extended and circular hydraulic actuators 11 acting upon sections 9.

Figure 2:
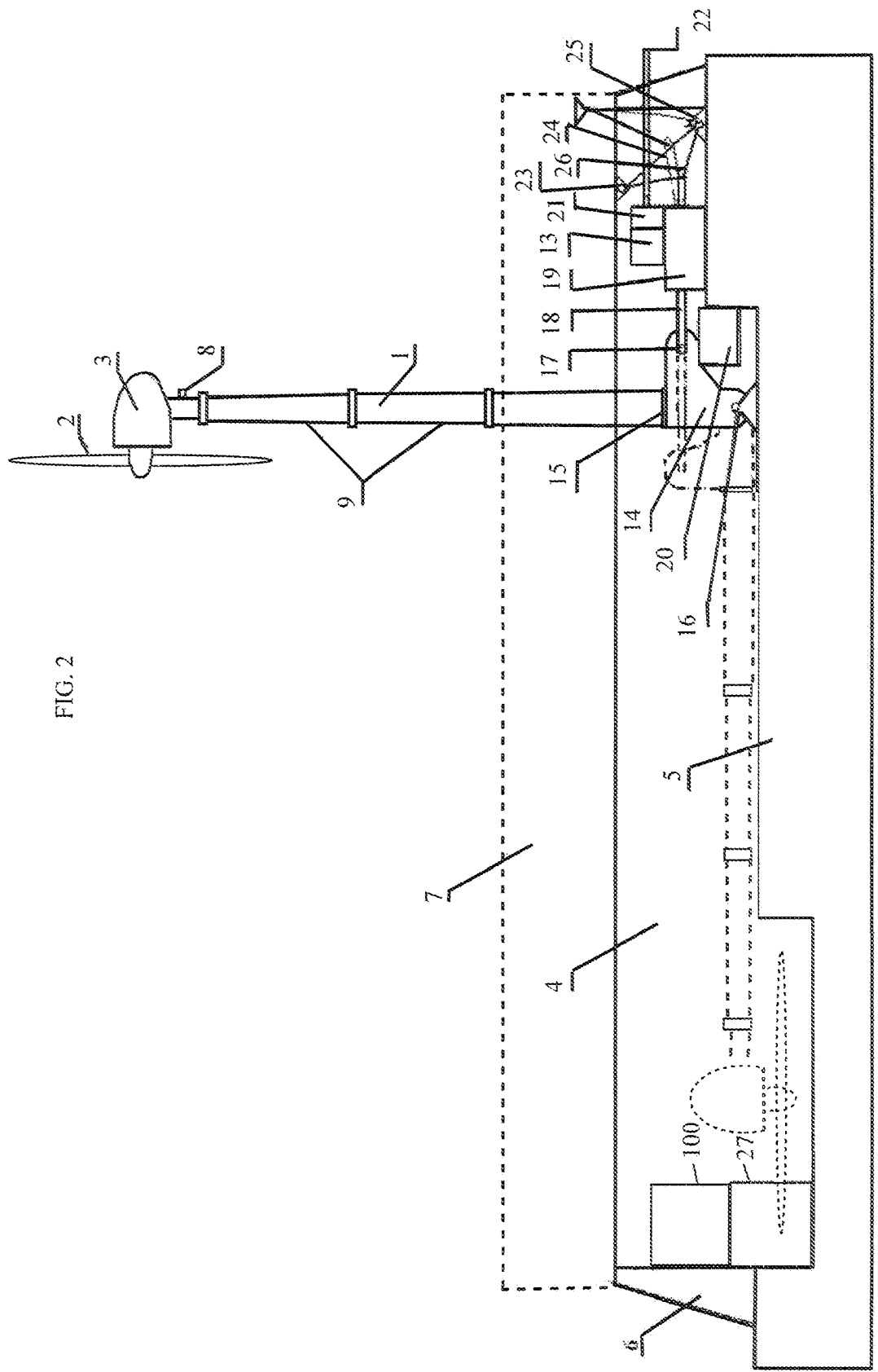
FIG. 2 is a diagram of a wind driven power plant according to a second embodiment.

In an alternative embodiment as shown in FIG. 2, the mast 1 is comprised of a plurality of sections 9 that are rigidly fastened to each other. The mast 1 thus remains fully extended when it is lowered into the stowed position as shown in phantom in FIG. 2. The chamber 4 and cover 7 are sized to allow for the stowing and unstowing of the windwheel 2 with the mast 1 fully extended.

Figure 3A:
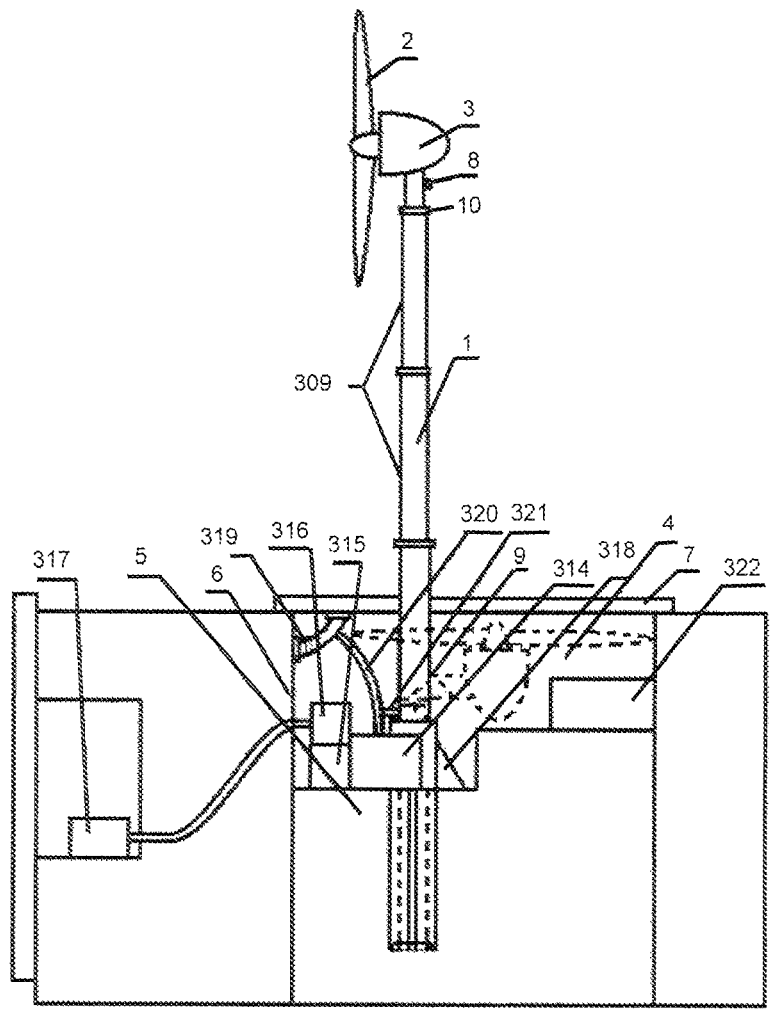
FIGS. 3A-3C are diagrams of a wind driven power plant according to a third embodiment.
Figure 3B:
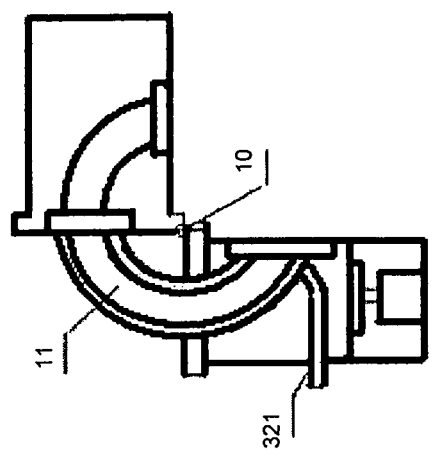
Figure 3C:
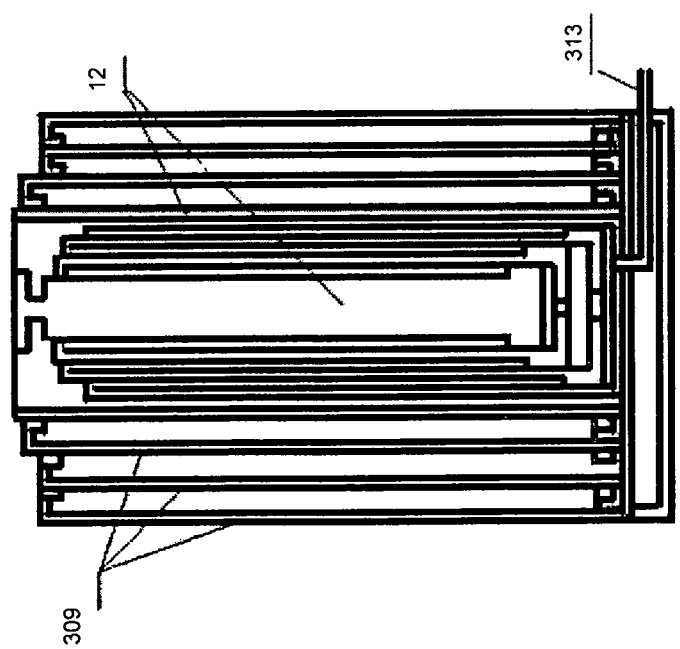

A third embodiment shown in FIGS. 3A-3C comprises a mast 1 with a windwheel 2 and a generator inside a nacelle 3, a shielding chamber 4 with a base 5, walls 6 and a cover 7. The nacelle 3 is connected to the mast 1 by the hinge 1- and the hinge 10 is equipped with the circular hydraulic actuator 11, as shown in FIG. 3B. A response sensor 8 is placed on the mast 1. As seen in FIG. 4, the generator 400 is inside the nacelle 3 and connected to the windwheel 2.

As shown in FIG. 3C, the mast 1 comprises sections 309, equipped with a hydraulic actuator 312 of telescopic type. The actuator 312 is connected by the flexible hose 313 with the electrically driven compressor 314 and the electric motor (not shown in figures) for fluid supply from the hydraulic reservoir 315 to the device hydraulic actuators 312 as seen in FIG. 3A. Furthermore, the electrically driven compressor 314 is connected with the manually driven compressor 317 via the liquid reduction unit 316.

The mast 1 bottom section is located in the through hole of the post 18, rigidly fastened to the base 5 by bolt fixtures, for example (not shown in figures).

The circular hydraulic actuator 319, connected by the hose 320 with the compressor 314, is located on the cover 7 of the shielding chamber 4. The compressor 314 is also connected with the hydraulic actuator 9 of the nacelle 3 by the hose 321.

Also, the wind-driven electric plant comprises the independent power supply source 322, located in the chamber 4 and connected with the compressor 314 via the electronic switch (not shown in figures).

The first embodiment at FIGS. 1A-1F operates in the following way. In a stowed mode, the mast 1 is disposed on the base 5 in the shielding chamber 4. On receiving a command from the remote control console (not shown) via the automatic control device 100 to the screw electric drive 19, the rod 18 starts moving from left-side position to the right, pushing the hinge 26 of the lever 24 and opens the cover 7 by means of the hinges 23 and 25. Simultaneously, the rod 18, connected as its other end with the post 14 via the hinge 17, causes the movement of the post 14 and by means of the hinge 16 raises the mast 1 with the windwheel 2 and the nacelle 3 to the vertical position, whereupon the wind-driven electric plant enters the operating mode.

In a case of any extreme situation, a command from the response sensor 8 via the automatic control device 100 is received by the screw electric drive 19, which drives the rod 18 from right-side position to left and turns the post relatively to the hinged connection 16, lowering the mast 1 from the vertical to the horizontal position, thereby stowing the mast 1, windwheel 2 and nacelle 3 in the shielding chamber 4. Simultaneously, the rod 18 by means of the hinge 26 causes the movement of the lever 24 and closes the cover 7 by means of the hinges 23 and 25. Manual control mode performs the execution of all above-mentioned operations by means of the manually driven rotation device 22 of the screw electric drive 19 through the reduction unit 21.

Folding and spreading of the mast 1 sections are performed either in vertical or in horizontal positions, with no connection to the above-mentioned actions. On accepting a command from the outer control remote console (not shown) by the automatic electronic switch (not shown), the switch turns on the independent power supply unit 27, connected via wire 97 with the compressor 13, which delivers the fluid under pressure from hydraulic reservoir 99 (shown in FIG. 1E) to the circular hydraulic actuator 11 of the upper section with the windwheel 2 and the nacelle 3 at first, via the flexible hose 12 routed inside the sections 9 of the mast 1 (shown in FIG. 1B), and sets the section in rotation relative to the hinge 10 until superposition with the next section is achieved.

Thereafter the fluid is delivered from the compressor 13 via the flexible hose 12 to the hydraulic actuator of the next section and said next section is rotated relatively to the hinge, connecting the first and the second sections etc. To fold the mast as shown in FIG. 1D, when a command from the outer control remote console (not shown) comes to the automatic electronic switch (not shown), the electronic switch turns on the independent power supply unit 27, connected with the compressor 13, which reduces pressure in the hydraulic actuator 11, extracting fluid via the hose 12, whereupon the sections 9 start rotation in the opposite direction relative to the hinge 10. The manually driven compressor for fluid supply to the hydraulic actuators 11 via the hose 12 is used for the manual mast folding and spreading.

The third embodiment FIGS. 3A-3C operates in the following way. The assembled mast 1, comprising set of sections 309, stowed in each other, is allocated on the base 5 in the shielding chamber 4. The nacelle 3 with the windwheel 2, connected with the top section via the hinge 10', is declined sideways and lies on the base 5, as shown in phantom in FIG. 3A. On accepting a command from the control remote console (not shown) the automatic control device (not shown in FIGS. 3A-3C) turns on the independent power supply unit 322, connected with the compressor 314, which is used for delivering fluid under pressure from the hydraulic reservoir 315 to the telescopic arrangement of the hydraulic actuators 312 via the hose 313, for fluid supply of the circular hydraulic actuator 319 of the cover 7 via the hose 320 (FIG. 3A) and for fluid supply of the circular hydraulic actuator 11 (shown in FIG. 3B) of the nacelle 3 via the hose 321. Under fluid pressure the pistons of the telescopic system start sequential lifting of the sections 309, simultaneously the circular hydraulic actuator 11 by fluid pressure lifts up the nacelle 3 so that the windwheel rotates on the hinge 10. The circular hydraulic actuator 319 lifts up the cover 7. Just after setting of the mast 1 with the windwheel 2 and the nacelle 3 to the vertical position, the wind-driven electric plant comes to operating mode.

In a case of extreme situations, on accepting a command from the response sensor 8, the independent power supply unit 322 turns on the compressor 314, which reduces pressure in the hydraulic actuators 11, 12, pumping out fluid therefrom, causing the sections 309 to telescopically fold and stow in the shielding chamber 4, the nacelle 3 to rotate and lay on the base 5, and closing the cover 7.

In manual control mode all abovementioned operations are performed by the manually driven compressor 317 through the liquid reduction unit 316.

The claimed set of structural components of all embodiments of the wind-driven electric plant provide considerable effectiveness and an operational reliability increase under extreme situations, permitting stowing of the mast with the windwheel and generator in the shielding chamber by a command from response sensors, which respond to a wide range of factors, indicating an extreme situation threat or approach, with the ability to more efficiently set the plant to the operating position, decreasing the risk of mechanical damage or destruction of the plant structure elements and providing continuity of the plant operation process during this period.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed is:

1. A wind-driven electric power plant comprising:
   a generator in a nacelle;
   a windwheel coupled to the generator;
   a mast comprising:
      a first end coupled to the nacelle;
      a second end;
      a set of sections pivotally connected with each other such that the mast has a capability of folding and spreading; and
      at each pivotal connection location between the sections, a circular hydraulic actuator coupled to each of the sections at the pivotal connection location and configured to rotate one of the sections at the pivotal connection location with respect to the other section at the pivotal connection location;
   a shielding chamber comprising a base, a sidewall, and a cover connected to the sidewall;
   a mast mount rigidly connected to the second end of the mast and pivotally connected to the base of the shielding chamber;
   a mast transfer mechanism coupled to the mast mount and configured to move the mast between an operating position with the windwheel outside of the chamber and a stored position with the windwheel inside of the chamber;
   a motor connected to the mast transfer mechanism, a controller connected to the motor, and a sensor connected to the controller, wherein the controller is configured to control the motor to operate the mast transfer mechanism in response to an output from the sensor.

2. The plant, as recited in claim 1, further comprising a manual control device configured to control the mast transfer mechanism and the circular hydraulic actuator at each pivotal connection between the set of sections.

3. The plant, as recited in claim 1, further comprising a remote control device.

4. The plant, as recited in claim 1, further comprising a mechanism for opening and closing the shielding chamber cover, wherein the mechanism is in communication with an automatic control device.

5. The plant, as recited in claim 4, wherein the mechanism for opening and closing the shielding chamber cover includes a manual control device.

6. The plant, as recited in claim 1, wherein the sensor comprises a response sensor selected from a group consisting of meteorological sensors, photo sensors, video sensors, radiation sensors, and radio signal receivers.

7. The plant, as recited in claim 1, further comprising an independent power supply unit connected to an automatic control device.

8. The plant, as recited in claim 6, wherein the independent power supply unit comprises a solar photo converter.

9. The plant, as recited in claim 6, wherein the independent power supply unit comprises a solar thermal collector with a thermal-electric energy converter.

10. The plant, as recited in claim 7, wherein the independent power supply unit comprises a diesel-electric unit along with an accumulator battery.

11. The plant, as recited in claim 1, wherein the shielding chamber is configured for location below ground level.

* * * * *